(No Model.) 2 Sheets—Sheet 1.
J. BERG.
SCREW TAP.
No. 347,864. Patented Aug. 24, 1886.
Fig. 1. Fig. 2. Fig. 7. Fig. 3. Fig. 4.
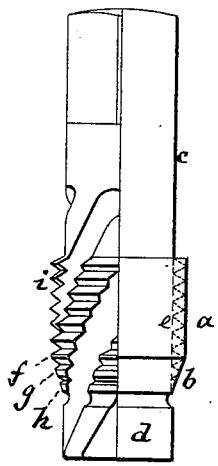
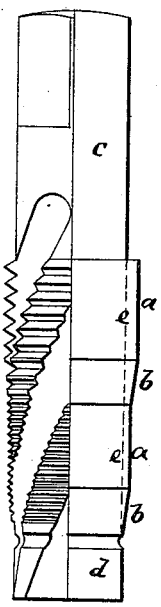
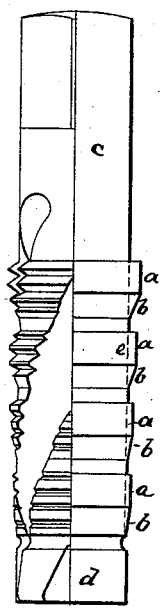
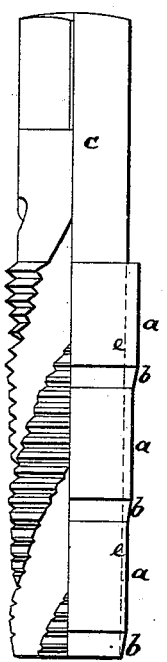
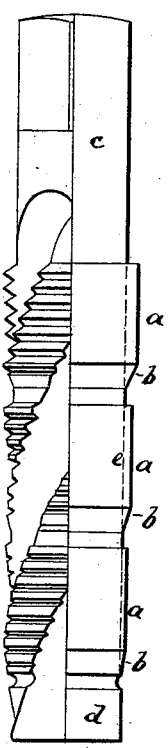
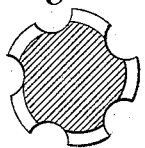
Fig. 1.ª
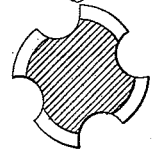
Fig. 2.ª
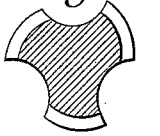
Fig. 7.ª
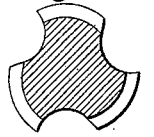
Fig. 3.ª
Fig. 4.ª
Fig. 5.
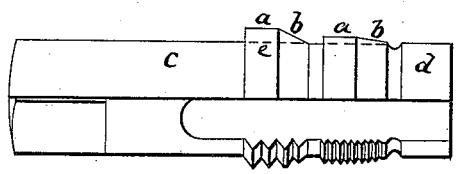
Fig. 6.
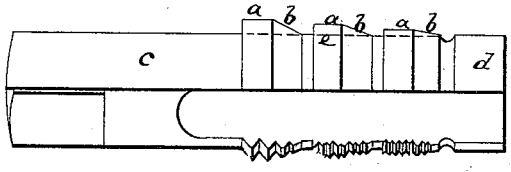
WITNESSES,
A. Schiehl.
Gustav Schneppé
INVENTOR.
Johann Berg.
By Briesen & Steele
ATTORNEYS.

(No Model.) 2 Sheets—Sheet 2.
J. BERG.
SCREW TAP.
No. 347,864. Patented Aug. 24, 1886.
Fig. 8. Fig. 9. Fig. 10. Fig. 11.
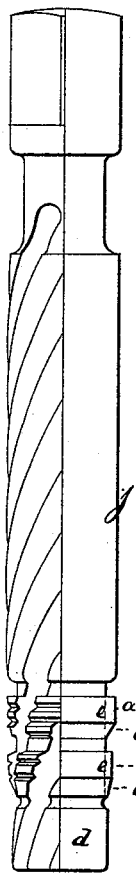
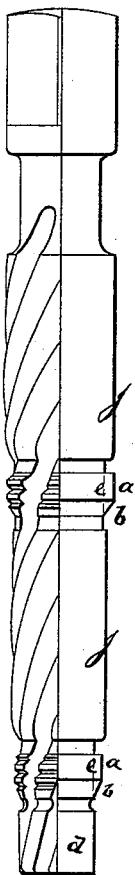
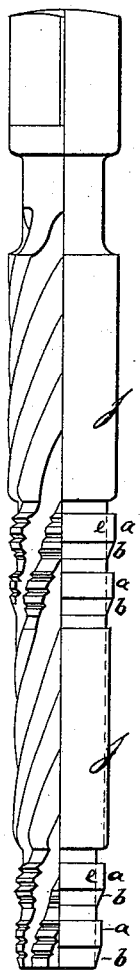
Fig. 8ᵃ.
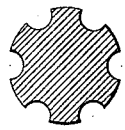
  Fig. 12ᵃ
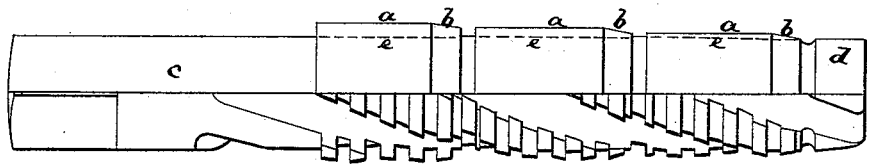
WITNESSES:
A. Schiel.
Gustav Schneppe
INVENTOR
Johann Berg.
BY Briesen & Steele
ATTORNEYS

UNITED STATES PATENT OFFICE.

JOHANN BERG, OF NUREMBERG, GERMANY.

SCREW-TAP.

SPECIFICATION forming part of Letters Patent No. 347,864, dated August 24, 1886.

Application filed May 29, 1886. Serial No. 203,593. (No model.)

*To all whom it may concern:*

Be it known that I, JOHANN BERG, a resident of Nuremberg, Germany, have invented an Improvement in Boring and Drilling Tools, of which the following is a full, clear, and exact description, reference being made to the accompanying drawings.

This invention relates to certain improvements in taps for cutting internal screw-threads and in reaming bits or broaches; and it consists, principally, in making every such tap or reamer with a conical threaded portion beneath a cylindrical threaded portion, so, however, that the threads enter the conical portions to a less depth than they do the cylindrical portions, all as hereinafter more fully described.

In the drawings, Figures 1, 2, 3, 4, 5, 6, 7, and 12 are side views of my improved screw-tap, showing various modifications of form. In each of the above figures the half on the right of the center line is represented as the tool appears before the screw-threads are cut into it, the other half being shown with the screw-threads. Figs. 8, 9, 10, and 11 are similar side views of my improved reamer; Figs. 1ª, 2ª, 3ª, 4ª, 7ª, 8ª, and 12ª being cross-sections of Figs. 1, 2, 3, 4, 7, 8, and 12, respectively.

Referring more particularly to Fig. 1 of the drawings, which represents the fundamental form of my improved tap or reamer, it will be seen that the cutting portion thereof consists of a cylindrical upper part, $a$, and a short conical lower part, $b$, both of which parts are formed on a shank, $c$. A guide-button, $d$, may be on the lower end of the implement, for the purpose of maintaining the tool in proper position at the time it first enters the hole to be threaded or reamed.

The characteristic part of my invention has reference only to the treatment of the sections $a$ $b$. These, as will be seen, are threaded; but the base-line of the threads (see the dotted line $e$ in Fig. 1) is parallel with the axis of the tool, so that the threads on the cylindrical portion $a$ are deeper than the threads on the conical portion $b$, and in the conical portion the threads are deeper at the upper than they are at the lower part thereof; hence the blunt appearance of the cone-threads $f$ $g$ $h$, that are on the portion $b$ of the tool, while the threads $i$ on the portion $a$ have a sharp edge in the example represented in Fig. 1.

In Fig. 2 the same character of tool is shown, excepting that it has two cylindrical sections, $a$, and two corresponding conical sections, $b$, the upper cylindrical section $a$ being larger in diameter than the lower cylindrical section $a$, the base-line $e$ for the threads in all these four sections being also parallel with the axis of the tool. It follows that the threads in the upper section $a$ are more pronounced than those in the lower section $a$.

Fig. 3 shows the same invention, but with three cylindrical sections, $a$ $a$ $a$, and three conical sections, $b$ $b$ $b$, the base-line $e$ being likewise parallel with the axis of the tool.

Fig. 4 shows the same tool that is shown in Fig. 3, with the exception that it has guide-button $d$ at the lower end, which in Fig. 3 is lacking.

Fig. 5 shows a tap having two cylindrical threaded portions, $a$, and two conical threaded portions, $b$, the threads on the lower portions $a$ $b$ being of a different character from those in the upper portions $a$ $b$. A similar tool is shown in Fig. 6, but with three sections, $a$ $b$, instead of two only, as in Fig. 5.

Figure 12:
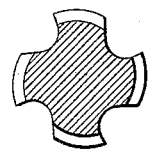
Fig. 12 shows a tap similar to that shown in Fig. 4, excepting that a different character of threads is here represented.

The reamers which are shown in Figs. 8, 9, 10, and 11 have below the regular reaming-bodies $j$ cylindrical sections $a$ and conical sections $b$, which are likewise threaded up to the line $e$, that is parallel with the axis of the tool.

The modifications which are shown in Figs. 8, 9, 10, and 11 will be readily understood. Thus Fig. 8 shows a single set of sections $a$ $b$ under the reamer proper, $j$; Fig. 9, a double set of sections $a$ $b$ under the reamer proper, $j$; Fig. 11, a single set of sections $a$ $b$ under each of two reamer portions $j$, the upper of these reamer portions being larger in diameter than the lower. Fig. 11 shows a reamer like that shown in Fig. 10, except that two sets of sections $a$ $b$ are beneath each of the reamer portions $j$.

With reference to the tap for forming a screw-thread, I desire to compare my improved tool with the ordinary tapering tap now in use. It is well known that at present nuts can be threaded only by the use of several taps, it being the practice to first use an entering taper tap, then a middle tap, and finally a plug-tap. By the use of my invention one single tap will answer the purpose. For very soft metal—such as brass—the tool shown in Fig. 1, with but a single set of sections $a\,b$, can be employed. The shavings will be cut out entirely by the conical section $b$, the threads in the cylindrical section $a$ serving to finish and, so to say, polish the spiral grooves that are cut in the nut by the conical portion $b$. Where my tool is used, the shavings will be thicker than those produced by the ordinary slender taper tap, but they will not be as wide, because each short conical section $b$ beneath the cylindrical section $a$ of my tool is the shaving-producing part of the tap, while in former taps, so far as I am aware, the entire length of the tap, being tapering, produced throughout its length a portion of the shaving.

For harder metal the tap shown in Fig. 2, and for still harder that shown in Fig. 3 or 7, can be used.

With my improved tool a complete nut will be produced by a single tap, and it will be so produced much more speedily than could heretofore be done, and with less labor.

So far as my invention is applicable to the reamer, it is clearly the same as that described with reference to the tap, because the sections $a\,b$ of each reamer are in substance screw-threading and finishing taps, the reamer-bodies $j$ serving to finally cut away the threads that are produced by the tap portions $a\,b$.

I do not claim a tap such as is shown in Patent No. 84,411, in which the scores between the teeth are cut deeper in the first sections than in the last or larger section, as my device will not be operative unless all the teeth are carried to the line $e$, which is parallel with the axis of the tool.

What I claim is—

A tap or reamer constructed with one or more conical sections, $b$, and one or more cylindrical sections, $a$, the said sections $a\,b$ being threaded down to a base-line, $e$, which is parallel with the axis of the tool, substantially as herein shown and described.

The foregoing specification of my improvement in boring and drilling tools signed by me this 7th day of May, 1886.

JOHANN BERG.

Witnesses:
 A. STICH,
 F. SCHATZ,
 A. HEIM.